United States Patent [19]

Purcell

[11] Patent Number: 5,065,145

[45] Date of Patent: Nov. 12, 1991

[54] METHOD AND APPARATUS FOR PRODUCING SIGNALS CORRESPONDING TO THE POSITION OF A CURSOR

[75] Inventor: Alexander M. Purcell, Guilford, Conn.

[73] Assignee: Summagraphics Corporation, Seymour, Conn.

[21] Appl. No.: 418,167

[22] Filed: Oct. 6, 1989

[51] Int. Cl.$^5$ ............................................. G09G 3/02
[52] U.S. Cl. .................................. 340/706; 33/1 M; 33/1 N; 340/709
[58] Field of Search ............... 33/1 M, 1 N; 340/710, 340/706, 709; 250/221, 201.6, 206.1, 206.3, 224; 178/18

[56] References Cited

U.S. PATENT DOCUMENTS

| | | |
|---|---|---|
| 3,462,548 | 8/1969 | Rinder . |
| 3,956,588 | 5/1976 | Whetstone et al. ................... 33/1 M |
| 4,331,954 | 5/1982 | Bauman et al. ....................... 340/706 |
| 4,530,243 | 7/1985 | Lund et al. ............................. 33/1 M |
| 4,892,407 | 1/1990 | McMurtry et al. .................... 33/1 M |
| 4,932,131 | 6/1990 | McMurtry et al. .................... 33/1 M |

Primary Examiner—Alvin E. Oberley
Assistant Examiner—Darin Miller
Attorney, Agent, or Firm—Rosen, Dainow & Jacobs

[57] ABSTRACT

A method and apparatus for indicating the position of a cursor on a surface in first and second different directions. The cursor is mounted on a member such as a gantry, and the gantry is guided for movement in the first direction on a carriage. The carriage is mounted for movement in the second direction on a member such as a rail. Radiation reflection strips extending and an acute angle with respect to one another are mounted on the gantry, and adapted to reflect light from a linear light source on said rail and extending in the second direction. Reflected light is sensed by a linear detector on said rail, for producing signals corresponding to the locations from which light was reflected. The coordinates of the cursor are determined by triangulation from these signals.

12 Claims, 3 Drawing Sheets

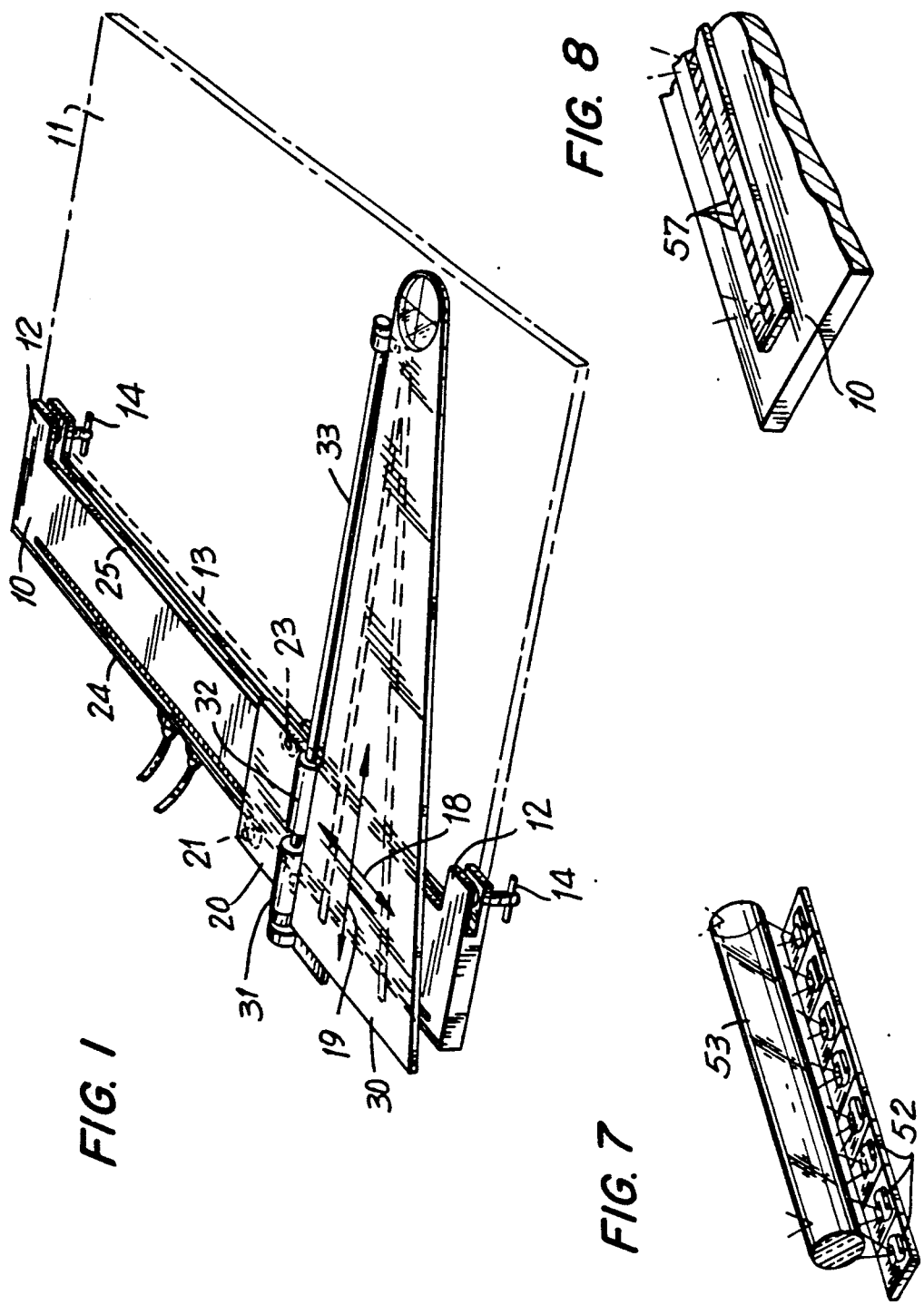

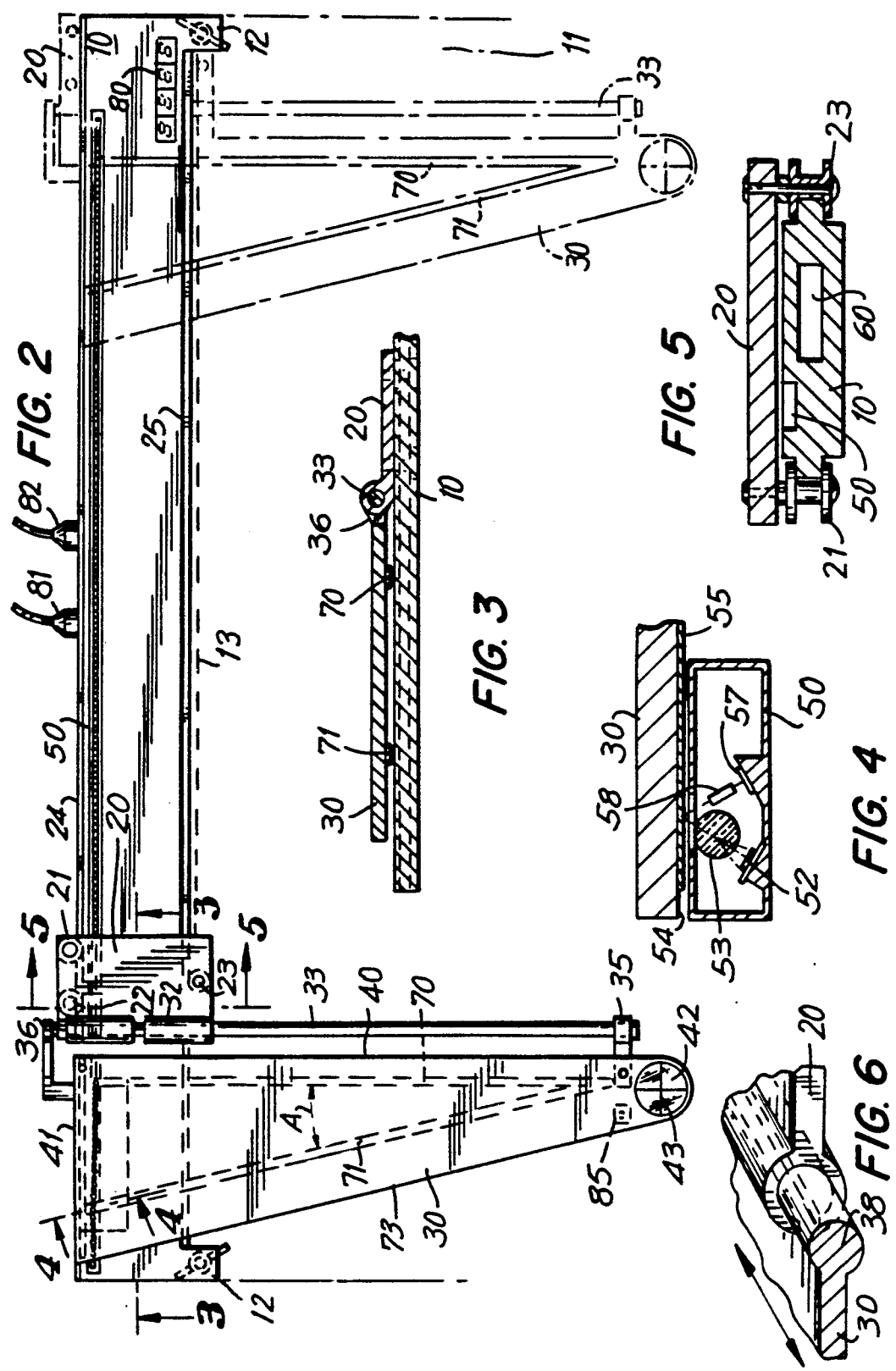

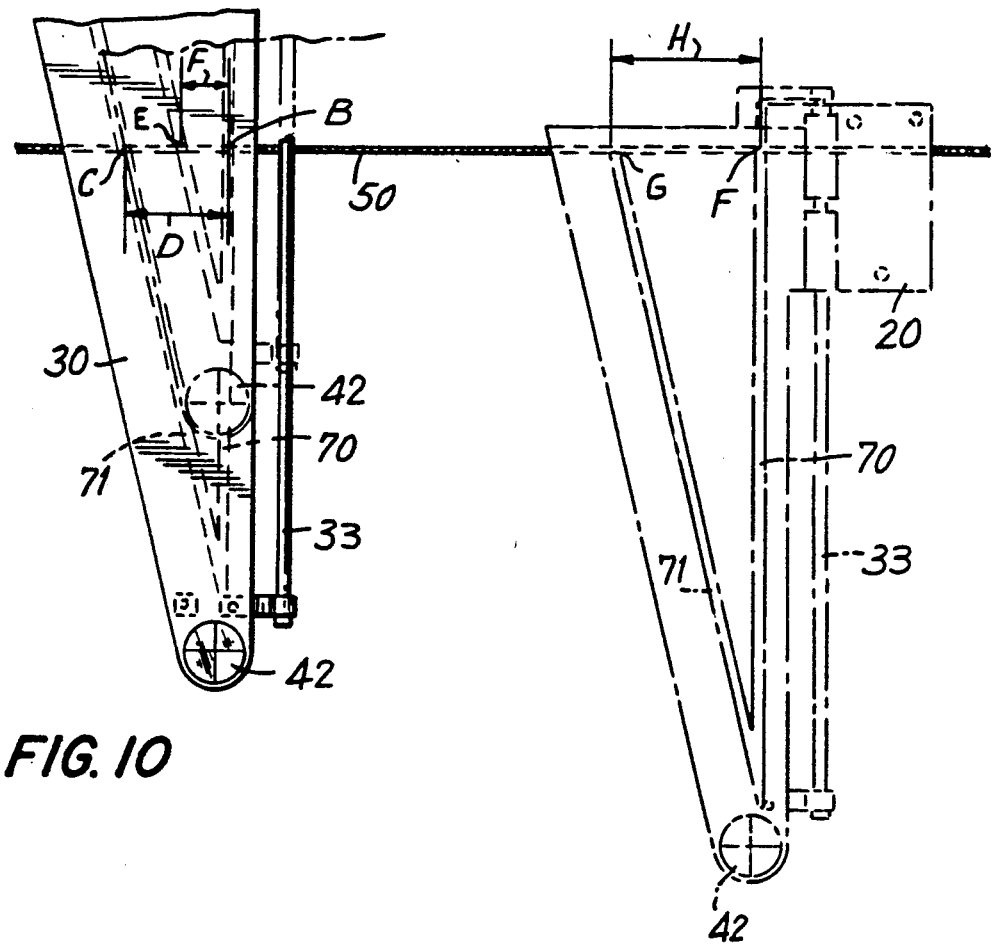

METHOD AND APPARATUS FOR PRODUCING SIGNALS CORRESPONDING TO THE POSITION OF A CURSOR

This invention relates to a method and apparatus for providing signals corresponding to the position of a cursor or the like, the apparatus being especially adapted to provide digital output signals, and/or a display, indicating the position of cross hairs or the like of a cursor on a planar surface, such as a drafting board, map, illustration, etc. It is of course apparent that the invention is not limited to these applications.

It is frequently desirable to provide electrical signals that correspond to the positioning of a device such as a cursor, in order, for example, to either position the device or display or store information corresponding to its position.

As an example, in the use of drafting devices it is desirable to provide a accurate measurement of the length or position of lines, without requiring the physical manipulation of a manually positioned measuring stick, and it is also desirable to provide means for accurately determining the relative spacing of elements, or positioning elements relative to one another, without the use of such a measuring stick.

It is of course apparent that this problem also exists in other fields than drafting.

The present invention is therefore directed to the provision of an improved method and arrangement for developing signals corresponding to the position or displacement of a cursor or the like, for example with reference to a surface.

Briefly stated, the invention provides a system for indicating the position of a cursor on a surface in first and second different directions, the cursor being mounted on a member such as a gantry or the like. A carriage or the like is guided for movement in the first direction, for example on a rail adapted to be held fixed with respect to the surface. The gantry is guided by the carriage for movement in the second direction. Spaced sensing regions, such as a pair of mirror strips are provided on the gantry, the strips being uniquely spaced for each displacement of the cursor in the second direction. Sensing means are mounted on a locus adjacent the first and second regions and extending in the first direction for sensing the displacements of adjacent portions of the first and second regions along the locus.

The sensing means may be mounted on the rail. The mirror strips may extend at an acute angle to one another, to provide the unique spacing thereof. The sensing means may comprise a linear light source mounted to direct light toward the gantry, and a linear detector array positioned to receive light reflected from the mirror strips.

The gantry may be mounted to the carriage by a shaft mounted thereto and extending in the second direction, and linear bearings on the carriage for receiving and guiding the shaft.

A microcomputer may be coupled to the linear detector array for calculating the position of the cursor by triangulation. The microcomputer, and a display for the calculated location, may be mounted to the rail. A switch may be mounted on the gantry and connected to the microcomputer for initiating the steps of computing the location of the cursor.

In the method in accordance with the invention, the gantry is guided to move linearly parallel to the surface in the second direction, and the carriage is guided to move orthogonal to the first direction and parallel to the surface. A linear light extending in the first direction directs light toward the gantry, thereby reflecting light from the mirrors strips at two positions that are uniquely spaced as a function of the location thereof in the second direction. This light is received, and the coordinates of the cursor are calculated from the detected spacing of the two positions and the absolute location of one of the two positions, by triangulation.

BRIEF FIGURE DESCRIPTION

In order that the invention may be more clearly understood, it will now be disclosed in greater detail with reference to the accompanying drawings, wherein:

FIG. 1 is a perspective view of a drafting device in accordance with the invention;

FIG. 2 is a top view of the drafting device of FIG. 1, illustrating one position of the gantry in solid lines and another position of the gantry in dash-dot lines;

FIG. 3 is a cross sectional view of the drafting device of FIG. 2 taken along the line 3—3;

FIG. 4 is a cross sectional view of the drafting device of FIG. 2 taken along the line 4—4;

FIG. 5 is a cross sectional view of the drafting device of FIG. 2 taken along the line 5—5;

FIG. 6 is an enlarged perspective view of a modification of the hinge arrangement of FIGS. 1-3;

FIG. 7 is a perspective view of a portion of a light source that may be used with the invention;

FIG. 8 is a perspective view of a portion of a light detector that may be used with the invention;

FIG. 9 is a block diagram of a circuit in accordance with the invention/ and

FIG. 10 is a view illustrating various positions of the cursor, to explain the operation of the invention.

DETAILED DISCLOSURE OF THE INVENTION

Referring now to the drawings, and more in particular to FIGS. 1-5, a coordinate determining device in accordance with one embodiment of the invention comprises a digital drafting device having a rail 10 adapted to be mounted to a drafting board 11 or the like, for example to extend along the rear edge of the drafting board. Thus, in the illustrated example, the rail 10 is provided with a clamp 12 at each end and adapted to receive the rear edge 13 of the board, with an adjusting screw 14 extending into the clamp from the underside thereof and adapted to be threaded against the underside of the board. In this embodiment of the invention, the top of the rail 10 is preferably held in a plane slightly above the plane of the top surface of the drafting board 11.

A carriage 20 is mounted for precise longitudinal movement along the rail, i.e. in a direction indicated by the arrow 18, hereinafter referred to as the X direction. For this purpose, bearings may be mounted to extend downwardly from the carriage to engage the front and rear edges of the rail. Thus, in the illustrated embodiment, first and second roller bearings 21,22 are spaced apart longitudinally of the rail and pivoted about vertical axes, so that their bearing surfaces engage the rear edge surface 24 of the rail. A third roller bearing 23 is mounted on a vertical axis intermediate the first and second bearings, with respect to the longitudinal direction of the rail, to roll on the front edge 25 of the rail. The bearings may ride on ridges or the like on the edges of the rail, as illustrated, to inhibit removal of the carriage from the rail. It is of course apparent that other precision mounting arrangements may be employed for mounting the carriage to the rail for movement in the longitudinal direction of the rail, i.e. the X direction. For example, an air bearing may be employed for this purpose.

A gantry 30, which may be triangular, is mounted to the carriage 20, for precise movement in a direction transverse to the longitudinal direction of the rail, in the direction of the arrow 19 referred to hereinafter as the Y direction. For example, the carriage 20 may be provided with a pair of linear bearings 31,32 spaced in the transverse direction of the rail, for receiving and guiding a rod or shaft 33 for movement longitudinally of the rod, i.e. transversely of the rail. The shaft 33 is affixed to the gantry 30 by clamps 35,36 at the ends thereof that hold the gantry spaced in the X direction from the shaft, to permit the shaft to be moved with precision in the Y direction, the clamps 35,36 also serving as stops to limit the extent of the permissible displacement of the gantry with respect to the carriage in the Y direction. One of the clamps, preferably the upper clamp 36, may be releasably fastened to the gantry by any conventional means, e.g. by wing nuts, snaps, etc., so that it can be pivoted out of clamping relationship with the shaft, to enable removal of the shaft and gantry assembly from the carriage. Of course other arrangements may be provided to permit such separation of the elements of the drafting device for moving, storage, or replacement of parts. It is of course apparent that the shaft 33 need not have a round cross section.

In an alternative embodiment of the invention, as illustrated in FIG. 6, shaft 33 may be replaced by an enlarged rounded edge 38 formed integrally with the gantry. In this case the linear bearings on the carriage are of course slotted to receive the rod.

The gantry may be right triangular shaped, as illustrated, with for example the right edge 40 thereof extending straight in the Y direction, and the upper edge 41 extending in the X direction. A pointer or cursor 42 is mounted on or formed in the gantry at the lower peak, or apex thereof. The cursor 42 preferably has cross hairs 43 or the like to permit visual alignment of the cursor with a desired feature on the drafting board, by manual movement of the gantry in the X and Y directions. The gantry may of course have a shape other than triangular.

A linear position sensing arrangement 50 is mounted to extend in the X direction, on or recessed in the rail 1?. This sensing arrangement may be comprised of a one-to-one contact type linear array detector, for example of the type employed on conventional telefax machines. It may thus include a linear light source positioned adjacent a linear position sensing arrangement 50. As illustrated more clearly in FIGS. 4 and 7, the linear light source may be comprised of a row of LEDs 52, mounted to direct light to a cylinder lens 53 extending in the X direction. The light is directed generally upwardly, as illustrated, toward the under surface 54 of the gantry 30, to be reflected from mirror surfaces 55 thereof, as will be discussed, and back down to a linear array detector 57, as shown in FIG. 4, for example via a SEL-FOC lens array (i.e. a 1:1 linear array of detectors of the type currently employed in telefax machines, and are self contained with a scanning IC). The elements of the linear array detector are connected to a logic circuit 60, such as a microcomputer, programmed to scan the elements of the linear array detector in conventional manner, so that the microcomputer 60 may identify those detector elements which are receiving light at any given time.

The mirror surfaces 55 include a first mirror strip 70 affixed to, or formed on, the under side of the gantry 30, to extend in the Y direction, preferably adjacent the edge 40 thereof that extends in the Y direction. A second mirror strip 71 is affixed to, or formed on, the under side of the gantry, for example adjacent the hypotenuse 73 thereof, to extend at an acute angle to the first mirror strip 70, for example at an angle of 30 degrees. This second strip 71 may join the first mirror strip 70 adjacent the cursor 30, and extend at an acute angle upwardly to the left of the first strip 70, as illustrated.

A circuit which may be employed in the drafting device of FIGS. 1-5 is illustrated in FIG. 9, wherein the microcomputer 60 is illustrated as being connected to the linear array detector 53 for receiving pulses that occur at times corresponding to the reception of light by a detector element aligned with one of the mirrors. In other words, the microprocessor scans the elements of the detector to determine those elements that have received light reflected from one of the mirrors 70,71. The microcomputer calculates the X and Y positions of the cursor from this information, and displays these coordinates on the display 80. A switch 85 may be provided to initiate each measurement process, if desired. The microcomputer may have output cables 81 for enabling transmission of the data to another computer, if desired. The light source 52 is connected to a source 83 of electricity via the cable 82.

It is apparent that, at any position of the gantry, in the X and Y directions, light will be reflected from the two mirror strips 70, 71 at two different positions of the linear array detector. The program of the microcomputer may directly ascertain the X position of the cursor cross hair by identifying the rightmost element of the linear array detector that is energized by reflected light. Thus, as illustrated in FIG. 10, considering the solid line position of the gantry, the detector senses the position B of the mirror strip 70, and the position C of the mirror strip 71. The position of the cursor in the X direction may correspond to the position of the energized element of the detector (if the mirror strip 70 is aligned with the cursor), or may be displaced in the X direction a predetermined distance therefrom in dependence upon the mechanical positioning of the cursor on the gantry.

The Y coordinate of the cursor cross hairs is determinable in a simple manner by triangulation, since the distance D between the two elements of the linear array that are energized by reflecting light from the two mirror strips 70,71 is determinable by the microcomputer. The elements of the linear array detector are spaced apart by known fixed distances. Accordingly, the length D of the base of a triangle having the cursor as its apex is known. Since the mirrors define the side and hypotenuse of a right triangle, and since the angles of the triangle are known and fixed, the Y direction distance between the cursor and any other fixed position on the board is readily determinable, i.e. being spaced from a linear array a distance $y = D \cot A$, wherein A is the apex angle of the triangle.

In the dash line representation of the gantry, at the left side of FIG. 10, the cursor has been moved upwardly in the Y direction only. The position B of the mirror 70 has thus not changed. In view of the angular relationship between the mirrors 70 71, however, the mirror 71 now intersects the detector 50 at the point E, resulting in a shorter distance between the points of intersection. It is thus apparent that, by locating the mirrors to have different and unique spacings for each location in the Y direction, it is possible to determine both the X and Y locations of the cursor with a minimum circuitry. The dashed line gantry at the right of the Figs. shows the cursor after it has been moved in the X direction, thereby resulting in different X direction intersections F and G spaced apart a distance H.

In accordance with the invention, the electronic circuitry including the microprocessor 60 for the drafting device may be conveniently located within the rail 10, i.e. the rail may be formed to define an interior space for receiving the electronic circuitry such as the microcomputer, as illustrated in FIG. 5. This simplifies the interconnections of the linear array to the calculating circuits. The rail may be provided with the conventional display 80 for displaying the X and Y coordinates of the cursor. The coordinates may of course also be externally available at the cable 81 or terminal, for application to an external computer or the like for storage, display, or any other desired purpose. Power may be supplied to the device via the further cable 82, if necessary.

In order to enable display of the coordinate position of the cursor, or the outputting of signals corresponding to the position thereof, at any given time, the switch 85 may be provided, for example on the gantry adjacent the cursor, the switch 85 being connected to the microcomputer to initiate the program for calculating the coordinates.

The precise determination of the coordinates of the cursor depends upon the maintenance of the right angle relationship between the X direction movement of the carriage and the Y direction movement of the gantry. Improper alignment of these axes, resulting for example from imprecise mechanical mounting of the carriage with respect to the linear array detector, or imprecise mechanical mounting of the gantry to the carriage, results in the exposure of a greater width of the first mirror strip 70 to the light source and linear array detector. It also results in a greater or lesser width of the second mirror strip 71 to the light source and linear array detector, depending upon the direction of the skew. The resultant variation of width of the light pattern reflected from the mirror strips to the linear array detector may be determined from the output of the linear array detector, and may be displayed on the display 80 to enable the operator to correctly align the carriage or gantry. Alternatively, of course, such variation in the detected widths of the received light patterns may be employed by the program of the microcomputer to correct for errors resulting from the skew by triangulation.

The coordinate determining system in accordance with the invention, as discussed above, preferably employs optical sensing devices in order to avoid adverse effects of magnetic or electromagnetic interference. It is apparent, however, that the invention is not limited to the use of optics, as provided in the preferred embodiment thereof as described above, but that other known energy sources and sensing devices may be employed, including but not limited to ultrasonic devices. It is further apparent that, alternatively to the use of reflecting strips on the gantry, similarly shaped slits may be employed and adapted to be aligned with opposed detecting and energy sources above and below the gantry.

It is of course apparent that the invention is not limited to the determination of rectangular coordinates, since the angular relationships between the sensing surface may be varied. Similarly, it is apparent that the device may be configured to determine the positions of a cursor with respect to non-planar surfaces.

While the invention has been disclosed and described with reference to a limited number of embodiments, it will be apparent that variations and modifications may be made therein, and it is therefore intended in the following claims to cover each such variation as falls within the true spirit and scope of the invention.

What is claimed is:

1. In a system for indicating the position of a cursor on a surface in first and second different linear directions, comprising a cursor, and means for moving said cursor with respect to said surface, the improvement wherein said means for moving said cursor comprises a first member, means for mounting said first member for movement in said first direction, a second member, means for mounting said second member to said first member for movement with respect thereto in said second direction, said cursor being mounted to said second member, first and second spaced sensing regions on said second member, the distance between said first and second regions, in said first direction, being unique for each displacement of said cursor in said second direction with respect to said first member, and sensing means mounted on a locus adjacent said first and second regions and extending in said first direction for sensing the displacements of adjacent portions of said first and second regions along said locus.

2. The system of claim 1 further comprising a mounting arrangement adapted to be fixedly mounted to said surface, said means for mounting said first member comprising a carriage mounted to be guided substantially only in said first direction on said mounting means.

3. The system of claim 2 wherein said sensing means is mounted on said mounting arrangement.

4. The system of claim 3 wherein said second member comprises a gantry, said first and second spaced sensing regions comprising first and second sensing strips extending at an acute angle to one another and mounted on said gantry.

5. The system of claim 4 wherein said sensing strips comprises mirror strips, and said sensing means comprises a linear light source mounted to direct light toward said gantry, and a linear detector array positioned to receive light reflected from said mirror strips.

6. The system of claim 4 wherein said means for mounting said second member comprises a shaft mounted to said gantry and extending in said second direction, and linear bearings on said carriage for receiving and guiding said shaft.

7. The system of claim 4 wherein said mounting arrangement comprises a linear element, said means for mounting said first element comprising linear guide means for guiding said carriage in said first direction.

8. The system of claim 5 further comprising a microcomputer coupled to said linear detector array for producing an output corresponding to the location of said cursor on said surface.

9. The system of claim 8 further comprising a display coupled to said microcomputer for displaying said location, said display and microcomputer being mounted to said mounting arrangement.

10. The system of claim 8 further comprising a switch mounted on said gantry and connected to said microcomputer, said microcomputer comprising means responsive to operation of said switch for calculating the position of said cursor.

11. In a system for indicating the position of a cursor on a surface in first and second relatively orthogonal directions, comprising a cursor adapted to be moved on said surface, the improvement comprising:
- a first guide adapted to be fixedly mounted to said surface,
- a carriage mounted to said first guide for linear movement in a first direction parallel to said surface,
- a second guide mounted to said carriage for linear movement in a second direction orthogonal to said first direction and parallel to said surface, said cursor being positioned on said second guide,
- said second guide having first and second sensing regions that are spaced apart in the first direction by distances that are unique for each location thereof in the second direction with respect to said first guide, and linear sensing means fixed on said first guide and extending in said first direction for sensing said first and second regions, and
- means coupled to said sensing means for indicating a function of said spacing.

12. A method for determining the coordinates of a cursor on a surface, wherein the cursor is mounted on a first element to be movable with respect to said surface, comprising guiding a second element to move linearly in a first direction parallel to said surface, guiding said first element to move linearly in a second direction orthogonal to said first direction and parallel to said surface, directing a linear light extending in said first direction toward said first element, reflecting said light from said first element at two positions that are uniquely spaced as a function of the location thereof in said second direction with respect to said second element, receiving said reflected light, and determining said coordinates from the detected spacing of said two positions and the absolute location of one of said two positions by triangulation.

* * * * *